United States Patent [19]
Takahashi et al.

[11] Patent Number: 5,628,568
[45] Date of Patent: May 13, 1997

[54] DYNAMIC PRESSURE BEARING HAVING LARGE LOAD-CARRYING CAPACITY AND PREVENTING DAMAGE OF OPPOSITE SURFACE AND METHOD OF MANUFACTURING THE SAME

[75] Inventors: Takeshi Takahashi, Yamatotakada; Yasuo Takamura, Yamatokooriyama, both of Japan

[73] Assignee: Koyo Seiko Co., Ltd., Osaka, Japan

[21] Appl. No.: 586,402

[22] Filed: Jan. 16, 1996

[30] Foreign Application Priority Data

Feb. 10, 1995 [JP] Japan ................................. 7-022622

[51] Int. Cl.$^6$ ........................................ F16C 17/04
[52] U.S. Cl. ............................................... 384/123
[58] Field of Search ................................. 384/123, 112, 384/369, 291, 292, 305

[56] References Cited

U.S. PATENT DOCUMENTS

| | | |
|---|---|---|
| 4,380,355 | 4/1983 | Beardmore et al. ................. 384/123 |
| 4,514,097 | 4/1985 | Daly ................................. 384/123 |
| 5,188,462 | 2/1993 | Hooper et al. ..................... 384/123 |

FOREIGN PATENT DOCUMENTS

| | | |
|---|---|---|
| 0589514 | 3/1994 | European Pat. Off. . |
| 1280254 | 7/1972 | United Kingdom . |
| 2064020 | 6/1981 | United Kingdom . |

*Primary Examiner*—Lenard A. Footland
*Attorney, Agent, or Firm*—Wenderoth, Lind & Ponack

[57] ABSTRACT

There is provided a dynamic pressure bearing which has a large load-carrying capacity and in which a ridge portion defined between adjacent grooves is prevented from damaging an opposite surface. The bearing includes an axial bearing surface having dynamic pressure generating grooves formed thereon by plastic working. The bearing has ridge portions defined between the adjacent dynamic pressure generating grooves. A top end of the ridge portion has rounded edge portions and a flat bearing surface defined between the edge portions. Since the edge portions of the top end are rounded, an opposite surface is prevented from being damaged. Further, the presence of the flat bearing surface defined between the edge portions results in increased load-carrying capacity.

2 Claims, 2 Drawing Sheets

DYNAMIC PRESSURE BEARING HAVING LARGE LOAD-CARRYING CAPACITY AND PREVENTING DAMAGE OF OPPOSITE SURFACE AND METHOD OF MANUFACTURING THE SAME

BACKGROUND OF THE INVENTION

1. Field of the Invention

The present invention relates to a dynamic pressure bearing having an axial bearing surface formed with dynamic pressure generating grooves, and a method of manufacturing the same.

2. Description of the Prior Art

Hitherto, a dynamic pressure bearing of this type has been known such that, as shown in FIG. 3, an axial bearing surface 51 has dynamic pressure generating grooves 52, 52 . . . formed thereon by press working of the axial bearing surface 51.

The dynamic pressure generating grooves 52, 52 . . . formed simply by press working have a drawback that each ridge portion 53 defined between the adjacent dynamic pressure generating grooves 52, 52 is tapered toward a direction in which it projects and, in addition, a projecting end or top end 53A of the ridge portion 53 is rounded all over so that the top end 53A which is to function as a bearing surface is not flat. Therefore, there occurs a problem that the dynamic pressure generating grooves 52 could only generate a small dynamic pressure, which results in a small load-carrying capacity.

Another type of dynamic pressure bearing is known such that, as shown in FIG. 2A, an axial bearing surface 61 has dynamic pressure generating grooves 62, 62 . . . formed thereon by etching being effected with the axial bearing surface 61. In this case, a top end 63A of a ridge portion 63 defined between the adjacent grooves 62 and 62 is not rounded or arcuately curved all over and contains a larger flat surface area than in the case of the first mentioned type of dynamic pressure bearing. This type of dynamic pressure bearing, therefore, can provide a larger load-carrying capacity than does the former type of dynamic pressure bearing.

In this instance, however, as shown in FIG. 2A, a projection 65 is likely to be formed on an edge portion of the top end 63A of the ridge portion 63 as a result of above mentioned etching. There occurs a problem that such a projection 65 may damage an opposite surface.

With a view to solving this problem, it may be conceived that each ridge portion 63 as shown in FIG. 2A is subjected to lapping, the top end 63A of the ridge portion 63 being then subjected to abrasion. By this treatment it is possible to eliminate such projection 65 present on the top end 63A of the ridge portion 63 as shown in FIG. 2B. However, the fact that the top end 63A is arcuately curved as a whole involves a problem that the load-carrying capacity is substantially reduced.

SUMMARY OF THE INVENTION

The object of the present invention is therefore to provide a dynamic pressure bearing which has a large load-carrying capacity and which prevents each ridge portion defined between adjacent grooves from damaging a surface opposite to a bearing surface, and a method of manufacturing the same.

In order to achieve the aforementioned object, the present invention provides a dynamic pressure bearing comprising:

dynamic pressure generating grooves formed on an axial bearing surface by plastic working;

ridge portions respectively defined between the adjacent dynamic pressure generating grooves, wherein a top end of each ridge portion has rounded edge portions and a flat bearing surface defined between the rounded edge portions.

In the dynamic pressure bearing of the invention, each ridge portion defined between the adjacent dynamic pressure generating grooves is such that the edge portions of the top end of the ridge portion are rounded or arcuately curved. This prevents the edge portions of the top end from damaging a surface opposite to the top end even though the edge portions contact such surface. Further, because the ridge portion has the flat bearing surface disposed between the edge portions on the top end, the dynamic pressure generated by the dynamic pressure generating grooves is enhanced as compared with the case in which a top end is rounded all over. This results in an increase in the load-carrying capacity.

In an embodiment, each ridge portion has a sectional configuration of generally rectangular shape when the ridge portion is cut along a plane extending along a direction in which the ridge portion projects.

Therefore, each dynamic pressure generating groove defined between the adjacent ridge portions is rectangularly recessed straight toward a bottom thereof. This permits generation of greater dynamic pressure by the dynamic pressure generating grooves as compared with the case in which each dynamic pressure generating groove is tapered toward a bottom of-the dynamic pressure groove. According to this embodiment, therefore, it is possible to achieve a greater increase in the load-carrying capacity of the bearing than that achievable by the first mentioned arrangement of the invention.

Also, in accordance with an embodiment, there is provided a method of manufacturing a dynamic pressure bearing comprising the steps of:

pressing a first die having projections and grooves defined between the adjacent projections against an axial bearing surface of a member so as not to allow the member to contact bottoms of the grooves of the first die, thereby forming dynamic pressure generating grooves and ridge portions with rounded edge portions on the member, and pressing a second die having a flat pressing surface against the ridge portions defined between the dynamic pressure generating grooves, with the flat pressing surface held in contact with a central portion of a top end of each ridge portion, thereby forming a flat bearing surface on the central portion of the top end and causing the round edge portions of the top end to remain round in each ridge portion.

In an embodiment, the first die is so configured that each projection has a sectional configuration of generally rectangular shape when each projection is cut along a plane extending along a direction in which the projection protrudes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described in detail with reference to FIGS. 1A–1C.

Figure 1A:
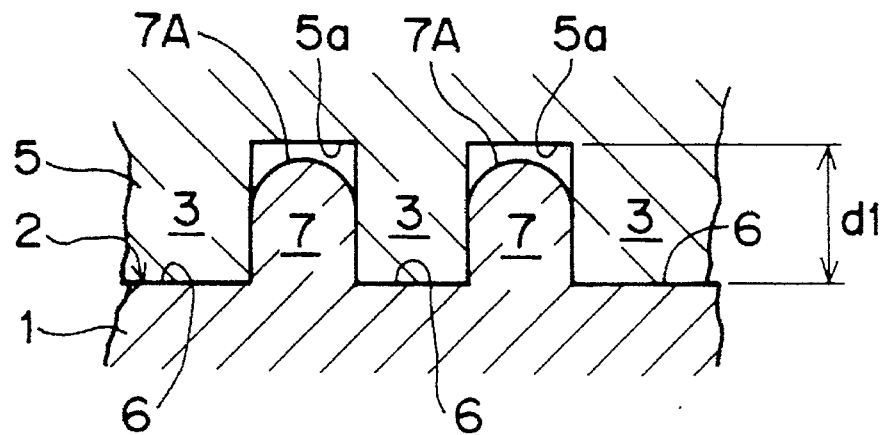
FIG. 1A is a sectional view for explaining a first step in a method-of manufacturing a dynamic pressure bearing according to an embodiment of the present invention.
Figure 1B:
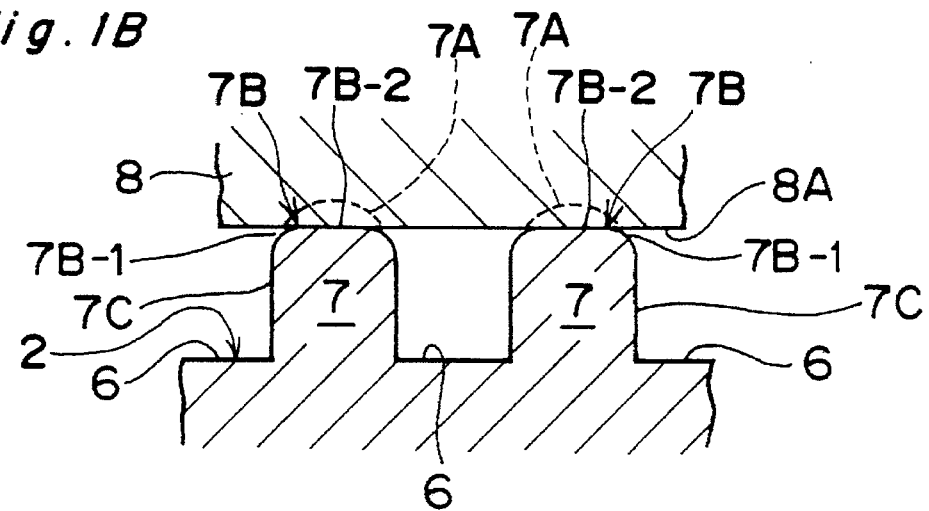
FIG. 1B is a sectional view for explaining a second step in the method of the embodiment.

The method of manufacturing a dynamic pressure bearing according to the embodiment of the invention is illustrated in FIGS. 1A and 1B. First, as shown in FIG. 1, a first die 5 having groove forming projections 3, 3 is vertically pressed against an axial bearing surface 2 of a member 1, whereby dynamic pressure generating grooves 6, 6, . . . , 6 are formed on the axial bearing surface 2. As shown in FIG. 1A, the first die 5 has a preset groove depth d1 such that when the first die 5 is vertically pressed against the bearing surface 2, a groove bottom 5a of the first die 5 is spaced from the crest or top end 7A of a corresponding ridge portion 7 defined between the adjacent grooves 6, 6. Therefore, during pressing of the first die 5 against the bearing surface 2, the top end 7A of the ridge portion 7 is not pressed. In this case, as shown in FIG. 1A, each ridge portion separating two dynamic pressure generating grooves 6, 6 is configured to be generally rectangular in section, with its top end arcuately curved or rounded, as cut along a plane extending along the direction in which the ridge portion 7 projects.

Next, as shown in FIG. 1B, a second die 8 having a flat pressing surface 8A is pressed against the rounded top ends 7A (shown in broken lines) of the ridge portion 7, with the flat pressing surface 8A held in contact with a center portion of the rounded top end 7A. As a result, the rounded top end 7A of the ridge portion 7 is changed in a formed top end 7B which has a flat central portion i.e. flat bearing surface 7B-2 and rounded edge portions 7B-1. That is to say, the pressing stroke of the second die 8 is preset so that the top end 7B of the ridge portion 7 has the rounded edge portions 7B-1 and the flat bearing surface 7B-2. The flat bearing surface 7B-2 is disposed between the rounded edge portions 7B-1. Also, as shown in FIG. 1B, the ridge portion 7 is configured to be generally rectangular in section as cut along a plane extending along the direction in which the ridge portion 7 projects.

Figure 1C:
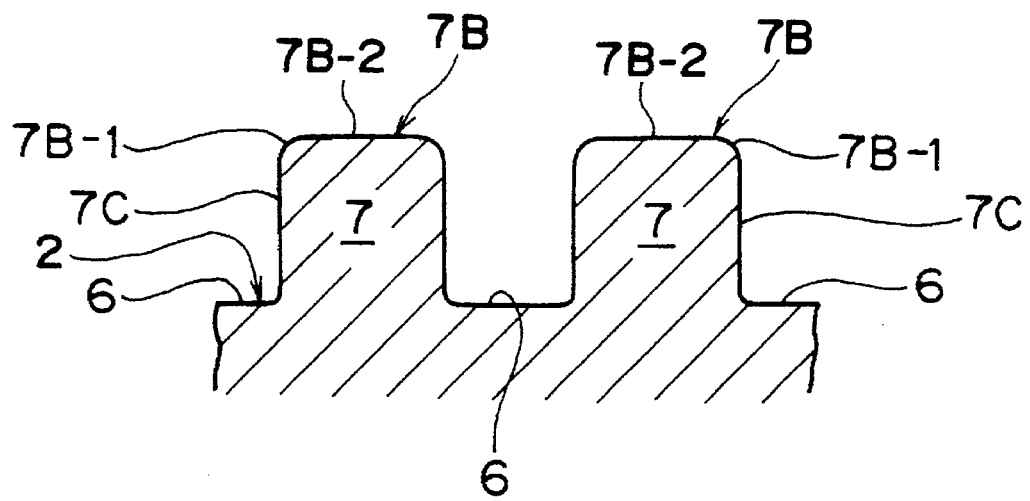
FIG. 1C is a sectional view showing the configuration of a bearing surface of a dynamic pressure bearing fabricated according to the method of the embodiment.
Figure 2A:
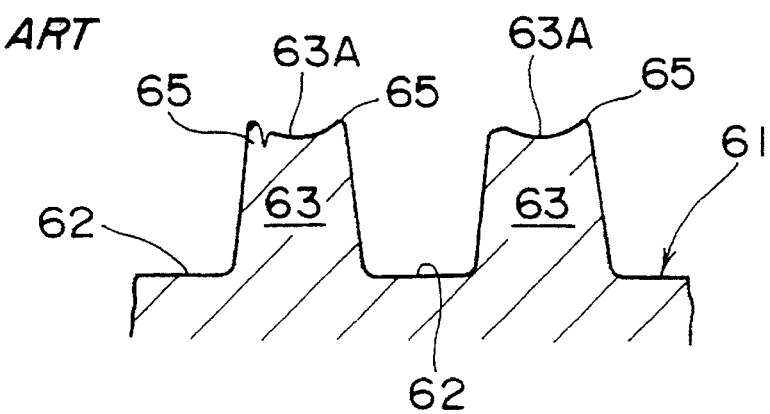
FIG. 2A is a sectional view showing the configuration of dynamic pressure generating grooves in a conventional dynamic pressure bearing as formed by etching.
Figure 2B:
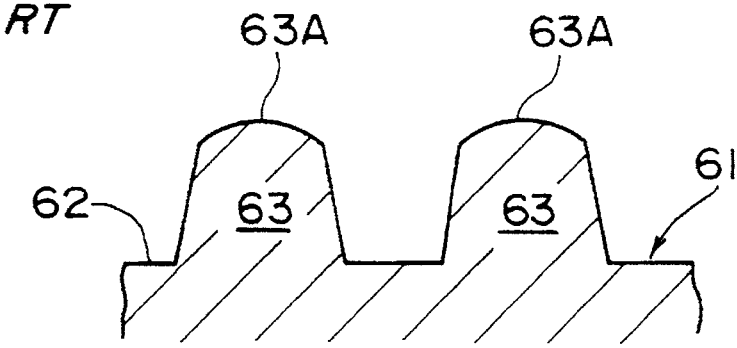
FIG. 2B is a sectional view showing a configuration of lapped ridge portions, each defined between the dynamic pressure generating grooves.
Figure 3:
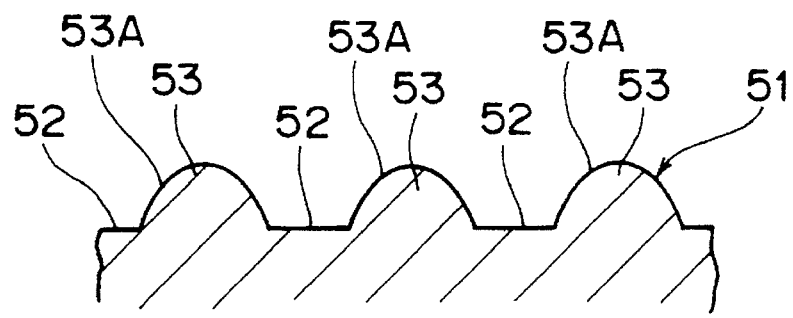
FIG. 3 is a sectional view showing the configuration of dynamic pressure generating grooves in a conventional dynamic pressure bearing as formed by pressing.

The axial bearing surface 2 of a dynamic pressure bearing manufactured according to the above described method of the above embodiment is shown in section in FIG. 1C. Each ridge portion 7 defined between the two adjacent dynamic pressure generating grooves 6, 6 is such that the top end 7B thereof has the arcuately curved edge portions 7B-1 and the flat bearing surface 7B-2 disposed between the edge portions 7B-1. The ridge portion 7 has a sectional configuration of generally rectangular shape when the ridge portion 7 is cut along a plane extending along the direction in which the ridge portion 7 projects, and the edge portions 7B-1 of the top end 7B are rounded. The ridge portion 7 has vertical sides 7C extending in a direction normal to a bottom of groove 6.

The dynamic pressure bearing of the above described construction, wherein the top end 7B of each ridge portion 7 defined between two dynamic pressure generating grooves 6, 6 is rounded at edge portions 7B-1 thereof, has an advantage that the edge portions 7B-1 of the top end 7B is prevented from coming into contact with a surface opposite to the top end 7B and is accordingly prevented from damaging the opposite surface. Further, because of the fact that the ridge portion 7 has a flat bearing surface 7B-2 defined between edge portions 7B-1, 7B-1 of the top end 7B, the dynamic pressure generating grooves 6 are capable of generating greater dynamic pressure than in the case where a bearing surface is rounded all over. This naturally results in increased load-carrying capacity.

In the dynamic pressure bearing of the foregoing construction, each ridge portion 7 is configured to be generally rectangular in section when cut along a plane extending in the direction in which the ridge portion 7 projects. Therefore, the dynamic pressure generating groove 6, that is, furrow 6 defined between the two adjacent ridge portions 7, 7, is generally rectangularly recessed straight toward the bottom of the dynamic pressure generating groove 6. This permits generation of greater dynamic pressure by the dynamic pressure generating grooves 6 as compared with the case in which each of dynamic pressure generating grooves is tapered toward its bottom. According to the above-described dynamic pressure bearing arrangement, therefore, it is possible to provide a dynamic pressure bearing having a particularly large load-carrying capacity.

As is apparent from the above description, in the dynamic pressure bearing of the invention, because the top end of each ridge portion defined between the adjacent dynamic pressure generating grooves has arcuately curved edge portions, the edge portions of the top end are prevented from contacting and damaging a surface opposite to the top end. Further, the top end of the ridge portion has the flat bearing surface defined between the edge portions, and this permits -generation of greater dynamic pressure by the dynamic pressure generating grooves than that possible in the case where the top end is rounded all over. This provides increased load-bearing capacity. Therefore, according to the invention, a dynamic pressure bearing is provided which has a larger load-carrying capacity and which eliminates the possibility of any ridge portion damaging a surface opposite thereto.

According to an embodiment, each ridge portion has a sectional configuration of generally rectangular shape when the ridge portion is cut along a plane extending along the direction in which the ridge portion projects. Therefore, each dynamic pressure generating groove defined between the adjacent ridge portions is rectangularly recessed straight toward the bottom thereof. This permits generation of greater dynamic pressure by the dynamic pressure generating grooves as compared with the case in which each of dynamic pressure generating grooves is tapered toward a bottom thereof. According to this embodiment, therefore, it is possible to achieve a greater increase in the load-carrying capacity of the bearing.

According to an embodiment, there is provided a method of manufacturing a dynamic pressure bearing comprising the steps of:

pressing a first die having projections and grooves defined between the adjacent projections against an axial bearing surface of a member so as not to allow the member to contact bottoms of the grooves of the first die, thereby forming dynamic pressure generating grooves and ridge portions with rounded edge portions on the member, and pressing a second die having a flat pressing surface against the ridge portions defined between the dynamic pressure generating grooves, with the flat pressing surface held in contact with a central portion of a top end of each ridge portion, thereby forming a flat bearing surface on the central portion of the top end and causing the round edge portions of the top end to remain round in each ridge portion.

Therefore, according to the embodiment, the flat bearing surface and the rounded edge portion of the top end are formed by the steps of pressing first and second dies against the axial bearing surface. Accordingly, it is possible to fabricate a dynamic pressure bearing which has a larger load-carrying capacity and which eliminates the possibility of a damage being caused to a surface opposite to the axial bearing surface.

In an embodiment, the first die is so configured that each projection has a sectional configuration of generally rectangular shape when each projection is cut along a plane extending along a direction in which the projection protrudes.

According to the embodiment, it is possible to manufacture the dynamic pressure bearing wherein the dynamic pressure generating groove, i.e., furrow defined between the adjacent ridge portions, is generally rectangularly recessed straight toward its bottom. Therefore, according to this embodiment, it is possible to manufacture a dynamic pressure bearing having a larger dynamic pressure generating capacity than that in the case where dynamic pressure generating grooves are tapered toward their bottoms.

The invention being thus described, it will be obvious that the same .may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure bearing comprising:

dynamic pressure generating grooves formed on an axial bearing surface by plastic working;

ridge portions respectively defined between the adjacent dynamic pressure generating grooves, wherein a top end of each ridge portion has rounded edge portions and a flat bearing surface defined between the rounded edge portions.

2. A dynamic pressure bearing as set forth in claim 1, wherein each ridge portion has a sectional configuration of generally rectangular shape when the ridge portion is cut along a plane extending along a direction in which the ridge portion projects.

* * * * *